UNITED STATES PATENT OFFICE.

ALEXANDER POLHILL BEVAN, OF TAVISTOCK, ENGLAND.

SOLDER OR THE LIKE AND PROCESS FOR PREPARING THE SAME.

1,281,126. Specification of Letters Patent. Patented Oct. 8, 1918.

No Drawing. Application filed August 9, 1917. Serial No. 185,300.

*To all whom it may concern:*

Be it known that I, ALEXANDER POLHILL BEVAN, a subject of the King of Great Britain, and a resident of Tavistock, Devon, England, have invented certain new and useful Improvements in Solder or the like and Processes for Preparing the Same, of which the following is a specification.

This invention relates to an improved solder which has many advantages over the usual commercial solder. For instance, the improved solder does not tend to form globules in the manner of ordinary solder when worked on a dirty or greasy surface, and it may be worked over holes of considerable size without any support, the solder being manipulated with a hot iron in the usual manner.

It may also be used for aiding the tinning of bad surfaces, while its manufacture is economical or even more so than ordinary solder. A further feature of great importance is the fact that the solder does not become liquid at the soldering temperature but remains in a plastic state.

According to this invention a solder for metals is prepared consisting of two metallic constituent parts, either or both of which parts may be composed of a metallic element, or several metallic elements in mixture, or of a metallic alloy, one metallic part or constituent only being fusible at an ordinary soldering temperature. The solder may be manufactured by forming an alloy in which one of the metallic constituents would crystallize out in a finely divided state at a temperature higher than an ordinary soldering temperature, or it may be manufactured by mixing finely divided and preferably tinned metallic particles with ordinary commercial soft solder, such finely divided particles being of some metal that is not fusible or soluble at the fusing temperature of the soft solder, and such finely divided particles may, consist of a single metal or of several metals alloyed together.

In preparing the solder in one method, I take ordinary solder and incorporate with it a finely divided metal such as copper or an alloy such as a brass alloy, care being taken when the solder and the finely divided metal are being heated together that no fusion or solution of the finely divided metal takes place so as to prevent an alloy forming between the finely divided metal and the solder. It is preferable that the metal or alloy constituent which has the higher fusing temperature be incorporated in a very finely divided or pulverulent form, though a serviceable solder for rough work is produced with this constituent in the form of coarse filing or shavings.

In another process the solder is made by taking a copper alloy having a large percentage of tin or zinc and heating it to a red heat with a quantity of ordinary soft solder. When it has fused the material is stirred and then cooled quickly. The hard copper alloy is found to have crystallized out in a very fine state, the degree of fineness depending on the rate of cooling.

I have found that a very efficient solder in accordance with this invention may be made from a brass alloy of copper and zinc in a finely divided form incorporated with ordinary solder.

I claim—

1. A solder formed of a plurality of metallic constituent parts, one of which is not fusible at the temperature at which the solder is to be worked.

2. A soldering alloy containing a finely crystallized ingredient having a fusing temperature higher than the soldering temperature.

3. The herein described process of producing a solder consisting of heating to a red heat a quantity of solder and a copper alloy fusible at a temperature higher than the solder, stirring the fused mixture and then cooling the same quickly to crystallize the copper alloy into a fine state.

In testimony whereof I affix my signature in presence of two witnesses.

ALEXANDER POLHILL BEVAN.

Witnesses:
 HARVEY J. BAVERSTOCK,
 CHARLES PACK.